(12) United States Patent
Bettger et al.

(10) Patent No.: US 8,329,267 B2
(45) Date of Patent: *Dec. 11, 2012

(54) FLEXIBLE EDGE SEAL FOR VACUUM INSULATING GLAZING UNITS

(75) Inventors: Kenneth J. Bettger, Pella, IA (US); David H. Stark, Evergreen, CO (US)

(73) Assignee: Eversealed Windows, Inc., Evergreen, CO (US)

( * ) Notice: Subject to any disclaimer, the term of this patent is extended or adjusted under 35 U.S.C. 154(b) by 306 days.

This patent is subject to a terminal disclaimer.

(21) Appl. No.: 12/688,859

(22) Filed: Jan. 15, 2010

(65) Prior Publication Data

US 2010/0178439 A1    Jul. 15, 2010

Related U.S. Application Data

(60) Provisional application No. 61/145,095, filed on Jan. 15, 2009.

(51) Int. Cl.
*E06B 3/66* (2006.01)
*E04C 2/54* (2006.01)
*F16J 15/02* (2006.01)

(52) U.S. Cl. .......... 428/34; 428/182; 277/406; 277/419; 277/644; 52/204.599; 52/786.13

(58) Field of Classification Search .............. 428/34, 428/182; 52/204.599, 786.1, 786.13; 49/484.1; 277/361, 406, 419, 644

See application file for complete search history.

(56) References Cited

U.S. PATENT DOCUMENTS

| 49,167 | A |   | 8/1865 | Stetson |
|---|---|---|---|---|
| 988,308 | A |   | 4/1911 | Campbell |
| 1,004,257 | A |   | 9/1911 | Higbee |
| 1,127,381 | A |   | 2/1915 | Byrnes |
| 1,388,126 | A |   | 8/1921 | Rohland |
| 1,436,197 | A |   | 11/1922 | Rohland |
| 1,560,690 | A |   | 11/1925 | Housekeeper |
| 2,011,557 | A |   | 8/1935 | Anderegg |
| 2,057,969 | A |   | 8/1935 | Payson |
| 2,119,009 | A |   | 5/1938 | Elias |
| 2,122,453 | A | * | 7/1938 | Clause ................. 428/34 |
| 2,177,001 | A |   | 10/1939 | Owen |
| 2,206,558 | A |   | 7/1940 | Bennet |

(Continued)

FOREIGN PATENT DOCUMENTS

EP      0240584 A    10/1987

(Continued)

OTHER PUBLICATIONS

PCT: International Search Report and Written Opinion of PCT/US2010/021287 (counterpart application); Sep. 3, 2010; 8 pgs.

(Continued)

*Primary Examiner* — Donald J Loney
(74) *Attorney, Agent, or Firm* — Howison & Arnott, L.L.P.

(57) ABSTRACT

A flexible edge seal is provided for a vacuum insulating glazing unit having a first glass pane and a second glass pane spaced-apart from the first. The edge seal comprises a seal member formed of a hermetically bondable material and having a first end, a second end and a center section disposed therebetween. The first end is hermetically bondable to a first glass pane. The second end is hermetically bondable to a second glass pane. The center section comprises a plurality of convolutes.

16 Claims, 5 Drawing Sheets

U.S. PATENT DOCUMENTS

| | | |
|---|---|---|
| 2,220,690 A | 11/1940 | Stupakoff |
| 2,308,918 A | 1/1943 | Hertel et al. |
| 2,625,717 A | 1/1953 | Wampler et al. |
| 2,708,774 A | 5/1955 | Seelen |
| 2,730,987 A | 1/1956 | Nelson |
| 2,756,467 A | 7/1956 | Etling |
| 3,232,732 A | 2/1966 | Wax |
| 3,389,522 A | 4/1966 | Hordis |
| 3,611,019 A | 10/1971 | Krembs |
| 3,698,878 A | 10/1972 | Hale et al. |
| 3,778,127 A | 12/1973 | Langston |
| 3,778,244 A | 12/1973 | Nedelec |
| 3,808,115 A | 4/1974 | Manion |
| 3,828,960 A | 8/1974 | Walles |
| 3,865,567 A | 2/1975 | Klomp |
| 3,901,997 A | 8/1975 | Groth |
| 3,902,883 A | 9/1975 | Bayer |
| 3,922,705 A | 11/1975 | Yerman |
| 3,940,898 A | 3/1976 | Kaufman |
| 3,971,178 A | 7/1976 | Mazzoni |
| 3,979,668 A | 9/1976 | Samulowitz |
| 3,990,201 A | 11/1976 | Falbel |
| 4,016,644 A | 4/1977 | Kurtz |
| 4,035,539 A | 7/1977 | Luboshez |
| 4,047,351 A | 9/1977 | Derner |
| 4,060,660 A | 11/1977 | Carlson |
| 4,063,271 A | 12/1977 | Bean et al. |
| 4,089,143 A | 5/1978 | Lapietra |
| 4,099,082 A | 7/1978 | Chodil et al. |
| 4,130,452 A | 12/1978 | Indri |
| 4,132,218 A | 1/1979 | Bennett |
| 4,186,725 A | 2/1980 | Schwartz |
| 4,204,015 A | 5/1980 | Wardlaw et al. |
| 4,261,086 A | 4/1981 | Giachino et al. |
| 4,274,936 A | 6/1981 | Love |
| 4,303,732 A | 12/1981 | Torobin |
| 4,355,323 A | 10/1982 | Kock |
| 4,357,187 A | 11/1982 | Stanley |
| 4,427,123 A | 1/1984 | Komeda et al. |
| 4,444,821 A | 4/1984 | Young |
| 4,468,423 A | 8/1984 | Hall |
| 4,486,482 A | 12/1984 | Kobayashi |
| 4,531,511 A | 7/1985 | Hochberg |
| 4,536,998 A | 8/1985 | Matteucci et al. |
| 4,547,432 A | 10/1985 | Pitts |
| 4,649,085 A | 3/1987 | Landram |
| 4,683,154 A | 7/1987 | Benson |
| 4,687,687 A | 8/1987 | Terneu |
| 4,737,475 A | 4/1988 | Thomas |
| 4,780,164 A | 10/1988 | Ruckheim |
| 4,798,695 A | 1/1989 | Redel |
| 4,928,448 A | 5/1990 | Phillip |
| 5,005,557 A | 4/1991 | Bachli |
| 5,009,218 A | 4/1991 | Bachli |
| 5,014,466 A | 5/1991 | Winner |
| 5,017,252 A | 5/1991 | Aldrich |
| 5,032,439 A | 7/1991 | Glicksman |
| 5,083,058 A | 1/1992 | Nonomura et al. |
| 5,085,926 A | 2/1992 | Iida |
| 5,086,729 A | 2/1992 | Katigiri |
| 5,107,649 A | 4/1992 | Benson |
| 5,115,299 A | 5/1992 | Wright |
| 5,115,612 A | 5/1992 | Newton et al. |
| 5,118,924 A | 6/1992 | Mehra et al. |
| 5,124,185 A | 6/1992 | Kerr |
| 5,157,893 A | 10/1992 | Benson et al. |
| 5,175,975 A | 1/1993 | Benson et al. |
| 5,227,206 A | 7/1993 | Bachli |
| 5,270,084 A | 12/1993 | Parker |
| 5,302,414 A | 4/1994 | Alkhimov et al. |
| 5,330,816 A | 7/1994 | Rusek |
| 5,370,913 A | 12/1994 | Lin |
| 5,378,527 A | 1/1995 | Nakanishi |
| 5,423,119 A | 6/1995 | Yang |
| 5,433,056 A | 7/1995 | Benson |
| 5,489,321 A | 2/1996 | Benson |
| 5,491,953 A * | 2/1996 | Lafond ............... 52/786.13 |
| 5,508,092 A | 4/1996 | Kimock |
| 5,525,430 A | 6/1996 | Chahroudi |
| 5,582,866 A | 12/1996 | White |
| 5,589,239 A | 12/1996 | Tomono et al. |
| 5,610,431 A | 3/1997 | Martin |
| 5,625,222 A | 4/1997 | Yoneda et al. |
| 5,643,644 A | 7/1997 | Demars |
| 5,657,607 A | 8/1997 | Collins et al. |
| 5,719,979 A | 2/1998 | Furuyama |
| 5,778,629 A | 7/1998 | Howes |
| 5,789,857 A | 8/1998 | Ymaura |
| 5,811,926 A | 9/1998 | Novich |
| 5,846,638 A | 12/1998 | Meissner |
| 5,855,638 A | 1/1999 | Demars |
| 5,856,914 A | 1/1999 | O'Boyle |
| 5,891,536 A | 4/1999 | Collins |
| 5,897,927 A | 4/1999 | Tsai |
| 5,902,652 A | 5/1999 | Collins et al. |
| 5,920,463 A | 7/1999 | Thomas et al. |
| 5,937,611 A | 8/1999 | Howes |
| 5,945,721 A | 8/1999 | Tatoh |
| 5,949,655 A | 9/1999 | Glenn |
| 5,950,398 A | 9/1999 | Hubbard |
| 5,982,010 A | 11/1999 | Namba et al. |
| 5,983,593 A | 11/1999 | Carbary et al. |
| 6,007,397 A | 12/1999 | Ju |
| 6,020,628 A | 2/2000 | Mravic et al. |
| 6,052,965 A | 4/2000 | Florentin |
| 6,054,195 A | 4/2000 | Collins |
| 6,071,575 A | 6/2000 | Collins |
| 6,083,578 A | 7/2000 | Collins |
| 6,101,783 A | 8/2000 | Howes |
| 6,114,804 A | 9/2000 | Kawase |
| 6,131,410 A | 10/2000 | Swierkowski |
| 6,139,913 A | 10/2000 | Van Steenkiste et al. |
| 6,141,925 A | 11/2000 | Halvorson, Jr. et al. |
| 6,168,040 B1 | 1/2001 | Sautner et al. |
| 6,191,359 B1 | 2/2001 | Sengupta et al. |
| 6,291,036 B1 | 9/2001 | Wang |
| 6,352,749 B1 | 3/2002 | Aggas |
| 6,365,242 B1 | 4/2002 | Veerasamy |
| 6,372,312 B1 | 4/2002 | Aggas |
| 6,383,580 B1 | 5/2002 | Aggas |
| 6,387,460 B1 | 5/2002 | Shukuri |
| 6,399,169 B1 | 6/2002 | Wang |
| 6,416,375 B1 | 7/2002 | Cho |
| 6,420,002 B1 | 7/2002 | Aggas et al. |
| 6,436,492 B1 | 8/2002 | Landa et al. |
| 6,444,281 B1 | 9/2002 | Wang |
| 6,468,610 B1 | 10/2002 | Morimoto |
| 6,478,911 B1 | 11/2002 | Wang |
| 6,479,112 B1 | 11/2002 | Shukuri |
| 6,497,931 B1 | 12/2002 | Aggas |
| 6,503,583 B2 | 1/2003 | Nalepka et al. |
| 6,506,272 B1 | 1/2003 | Aggas |
| 6,521,988 B2 | 2/2003 | Hauser et al. |
| 6,537,121 B1 | 3/2003 | Baret |
| 6,538,312 B1 | 3/2003 | Peterson et al. |
| 6,541,083 B1 | 4/2003 | Landa et al. |
| 6,541,084 B2 | 4/2003 | Wang |
| 6,548,895 B1 | 4/2003 | Benavides et al. |
| 6,558,494 B1 | 5/2003 | Wang |
| 6,571,580 B1 | 6/2003 | Lodge |
| 6,627,814 B1 | 9/2003 | Stark |
| 6,635,321 B2 | 10/2003 | Wang et al. |
| 6,637,644 B2 | 10/2003 | Bachli |
| 6,639,313 B1 | 10/2003 | Martin et al. |
| 6,641,689 B1 | 11/2003 | Aggas |
| 6,653,724 B1 | 11/2003 | Kim et al. |
| 6,656,768 B2 | 12/2003 | Thomas |
| 6,668,500 B1 | 12/2003 | Lamberts |
| 6,692,600 B2 | 2/2004 | Veerasamy |
| 6,696,849 B2 | 2/2004 | Ban et al. |
| 6,701,749 B2 | 3/2004 | Wang et al. |
| 6,723,379 B2 | 4/2004 | Stark |
| 6,736,295 B2 | 5/2004 | Lin et al. |
| 6,759,590 B2 | 7/2004 | Stark |
| 6,763,638 B1 | 7/2004 | Berger, Jr. |
| 6,789,362 B1 | 9/2004 | Hessabi |
| 6,793,990 B1 | 9/2004 | Sakaguchi |

| | | | |
|---|---|---|---|
| 6,860,075 B2 | 3/2005 | Bachli | |
| 6,897,125 B2 | 5/2005 | Morrow et al. | |
| 6,924,974 B2 | 8/2005 | Stark | |
| 6,928,776 B2 | 8/2005 | Hornung | |
| 6,946,171 B1 | 9/2005 | Aggas | |
| 6,955,026 B2 | 10/2005 | Misonou | |
| 6,962,834 B2 | 11/2005 | Stark | |
| 6,966,208 B1 | 11/2005 | Collins | |
| 6,974,518 B2 | 12/2005 | Hornung | |
| 6,974,622 B2 | 12/2005 | Wade | |
| 7,045,181 B2 | 5/2006 | Yoshizawa | |
| 7,081,178 B2 | 7/2006 | Collins | |
| 7,100,343 B2 | 9/2006 | France | |
| 7,114,306 B2 | 10/2006 | Minaai | |
| 7,141,130 B2 | 11/2006 | Minaai | |
| 7,238,546 B2 | 7/2007 | Stark | |
| 7,517,712 B2 | 4/2009 | Stark | |
| 7,832,177 B2 | 11/2010 | Stark | |
| 2001/0020738 A1 | 9/2001 | Iizima et al. | |
| 2002/0041424 A1 | 4/2002 | Lynam | |
| 2002/0043046 A1 | 4/2002 | Cooper et al. | |
| 2002/0113296 A1 | 8/2002 | Cho et al. | |
| 2003/0188881 A1 | 10/2003 | Stark | |
| 2004/0020676 A1 | 2/2004 | Stark | |
| 2004/0104460 A1 | 6/2004 | Stark | |
| 2004/0111986 A1 | 6/2004 | Zurhaar | |
| 2004/0161530 A1 | 8/2004 | Stark | |
| 2004/0187437 A1 | 9/2004 | Stark | |
| 2004/0188124 A1 | 9/2004 | Stark | |
| 2005/0067179 A1 | 3/2005 | Stark | |
| 2005/0138892 A1 | 6/2005 | Misinou | |
| 2005/0217319 A1 | 10/2005 | Yoshizawa | |
| 2005/0257877 A1 | 11/2005 | Stark | |
| 2005/0275079 A1 | 12/2005 | Stark | |
| 2006/0157274 A1 | 7/2006 | Stark | |
| 2006/0187608 A1 | 8/2006 | Stark | |
| 2006/0191215 A1 | 8/2006 | Stark | |
| 2006/0207218 A1 | 9/2006 | Minaai et al. | |
| 2009/0032924 A1 | 2/2009 | Stark | |
| 2009/0074997 A1 | 3/2009 | Stark | |
| 2009/0324858 A1 | 12/2009 | Jaeger | |
| 2010/0034996 A1 | 2/2010 | Mott | |
| 2010/0068561 A1 | 3/2010 | Rohwer et al. | |
| 2010/0119740 A1 | 5/2010 | Bettger | |
| 2010/0175347 A1 | 7/2010 | Bettger | |
| 2010/0178439 A1 | 7/2010 | Bettger | |

FOREIGN PATENT DOCUMENTS

| | | |
|---|---|---|
| EP | 0983974 A1 | 3/2000 |
| EP | 1544180 A1 | 6/2005 |
| JP | 10-297944 A | 11/1998 |
| JP | 10-330134 A | 12/1998 |
| WO | 2006121954 A | 11/2006 |
| WO | 2010019484 A2 | 2/2010 |

OTHER PUBLICATIONS

PCT: International Search Report and Written Opinion of PCT/US2010/021286 (related application); Sep. 16, 2010; 7 pgs.
PCT: International Preliminary Report on Patentability of PCT/US2004/002272 (related application); Mar. 16, 2005; 4 pgs.
PCT: International Preliminary Examination Report of PCT/US2003/007553 (related application); Apr. 19, 2004; 7 pgs.
PCT: International Preliminary Report on Patentability of PCT/US2005/013237 (related application); Apr. 18, 2007; 9 pgs.
PCT: International Preliminary Report on Patentability of PCT/US2009/053206 (related application); Feb. 24, 2011; 7 pgs.
PCT: International Preliminary Report on Patentability with International Preliminary Examination Report of PCT/US2010/021287 (counterpart application); May 19, 2011; 8 pgs.
Arata et al. Pressure and Field Assisted Bonding of Glass to Aluminum; Transactions of JWRI is published by Welding Research Institute of Osaka University; vol. 13; No. 1; 1984; pp. 35-40.
Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.
Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.
Doron Teomim, Avner Badihi, Gil Zilber; "An innovative approach to wafer-level MEMS packaging"; Solid State Technology (Magazine); Jan. 2002; Penwell (Publ.); Nashua, NH USA.
Dunkerton; TWI Knowledge Summary Diffusion Bonding; Copyright 2001; TWI World Centre for Materials Joinging Technology Website; www.twi.co.uk; United Kingdom; 4 pages.
George S. Brady, et al., Materials Handbook, 12th Edition; 1986; pp. 28-29; McGraw-Hill Book Company; New York.
JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory. California Institute of Technology; Pasedena, CA, USA (Best Available Copy).
Kazakov et al.; Equipment for Diffusion Welding of Rectangular Glass Plates to Kovar; Svarochnoe Proizvodstvo; Jun. 1977; p. 50; (in Russian, English translation provided).
Kazakov, N.F. (ed.); Diffusion Bonding of Materials; 1981; pp. 4-9, 248-257; Pergamon Press; U.S.A.
Nicholas, M.G. & Lee, R. J.; Joining Dissimilar Materials, Metals and Materials, The Journal of the Institute of Metals, vol. 5, No. 6, Jun. 1989; UK.
NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasedena, CA, USA (Best Available Copy).
Ostyn, K. & Vinckier, A.; Joining of Different Materials Through Interfaces; Interfaces in Materials, Proceedings of the Colloquium; pp. 153-173; Brussels, Dec. 1988.
PCT: International Search Report of PCT/US03/07553 (related application); International Publication No. WO 03/083938 A1; Jun. 16, 2003; 2 pgs.
PCT: International Search Report of PCT/US04/02272 (related application); International Publication No. WO 2004/068189; Jan. 27, 2004; 1 pg.
R.C. Dykhuizen et al.; Gas Dynamic Principles of Cold Spray; Journal of Thermal Spray Technology; vol. 7(2); pp. 205-212; Jun. 1998.
Sadovsky et al.; Precision Welding of Glass to Kovar Without Melting; Svarochnoe Proizvodstvo; Feb. 1973; pp. 22; (In Russian, English translation provided).
PCT: Written Opinion of the International Searching Authority of PCT/US04/02272 (related application); International Publication No. WO 2004/068189; Mar. 16, 2005; 3 pgs.
PCT: International Search Report of PCT/US05/13237 (related application); International Publication No. WO 2005/118291 A3; Oct. 24, 2006; 1 pg.
PCT: Written Opinion of the International Searching Authority of PCT/US05/13237 (related application); International Publication No. WO 2005/118291; Oct. 24, 2006; 5 pgs.
PCT: International Search Report of PCT/US06/17595 (related application); International Publication No. WO 2006/121954; Aug. 20, 2008; 3 pgs.
PCT: Written Opinion of the International Searching Authority of PCT/US06/17595 (related application); International Publication No. WO 2006/121954; Aug. 20, 2008; 10 pgs.
PCT: International Search Report of PCT/US08/76278 (related application); Jan. 16, 2009; 4 pgs.
PCT: Written Opinion of the International Searching Authority of PCT/US08/76278 (related application); Jan. 16, 2009; 5 pgs.
PCT: International Preliminary Report on Patentability of PCT/US2008/076278 (related application); Mar. 25, 2010.
"Diffusion Bonding—Ceramics and ceramic/meal joints", TWI Knowledge Summary, 2000. http://www.twi.co.uk/content/ksjaf005.html.
PCT: International Search Report and Written Opinion of PCT/US2009/053206 (related application); Feb. 17, 2010; 8 pgs.

* cited by examiner

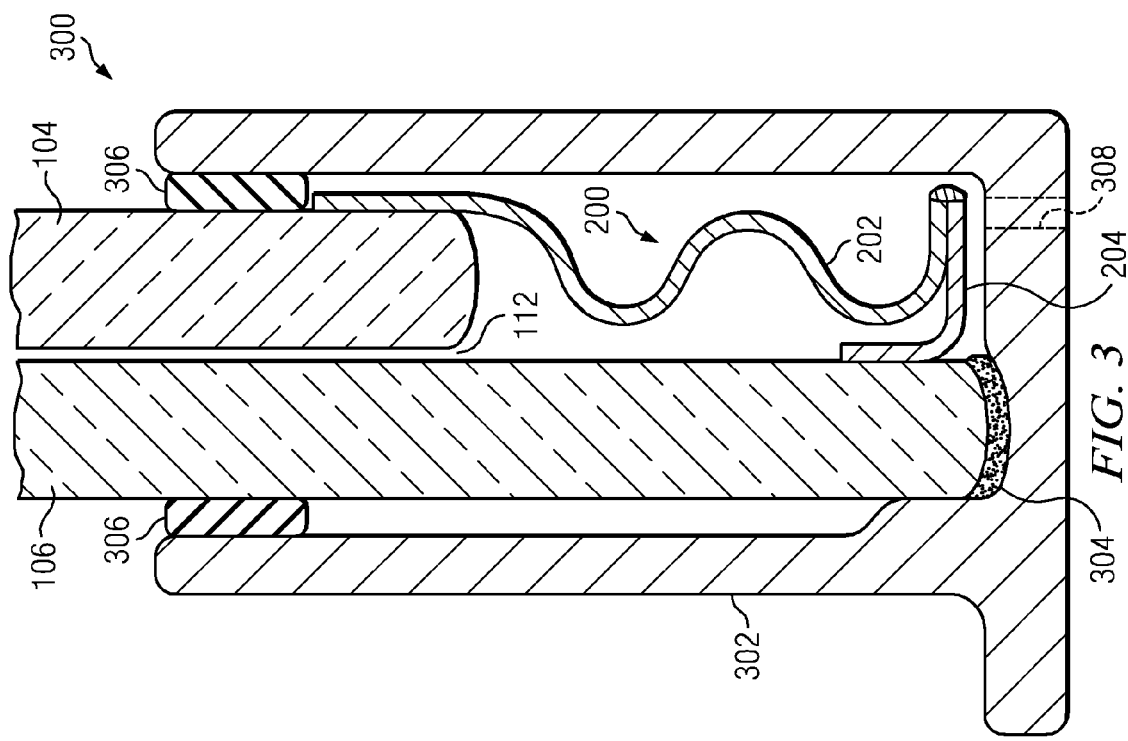
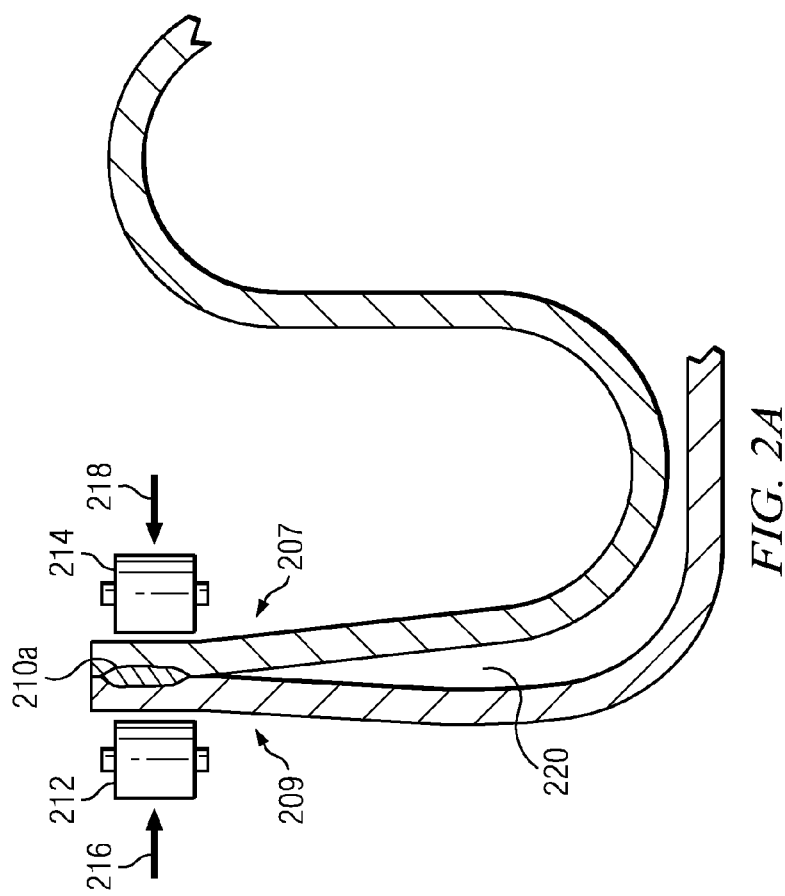

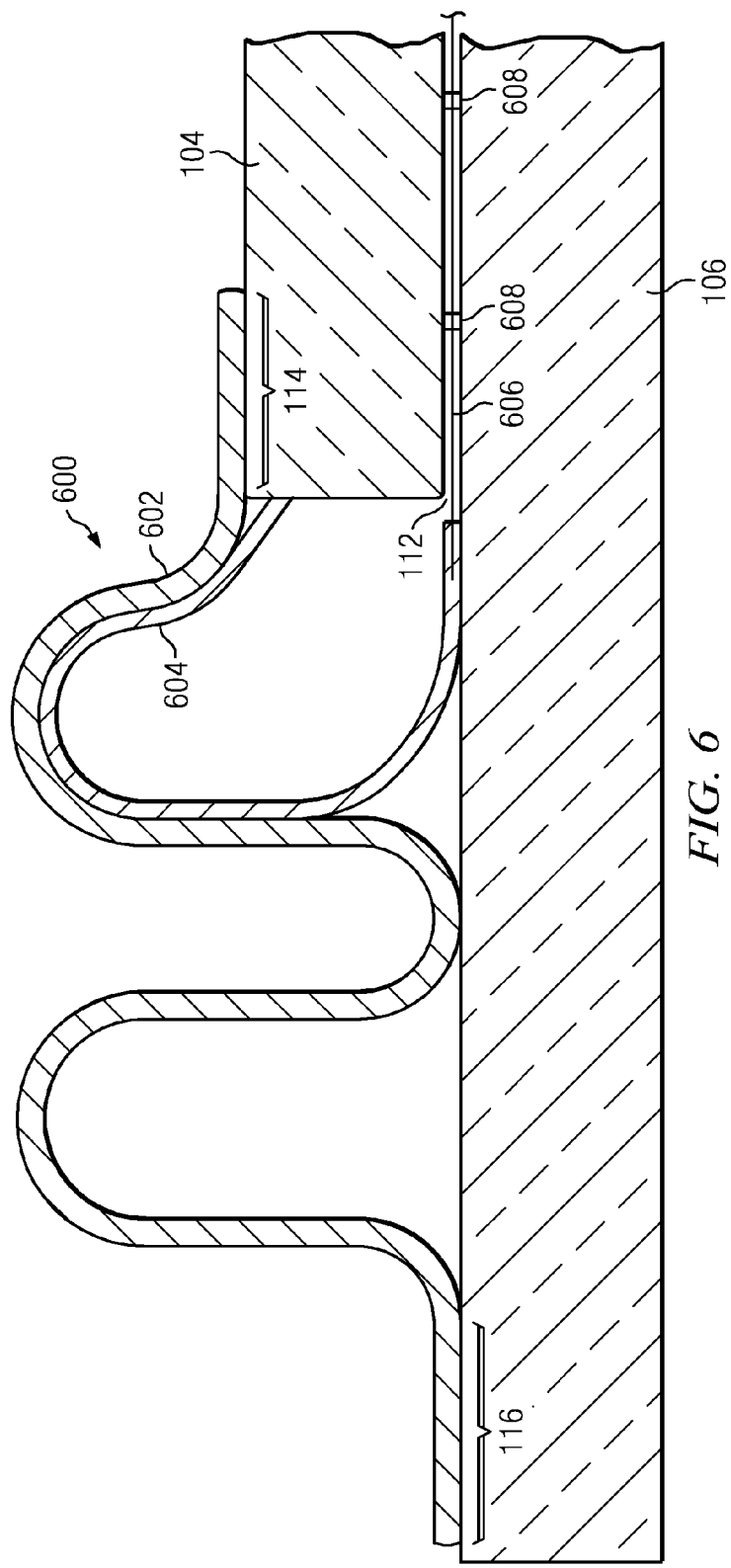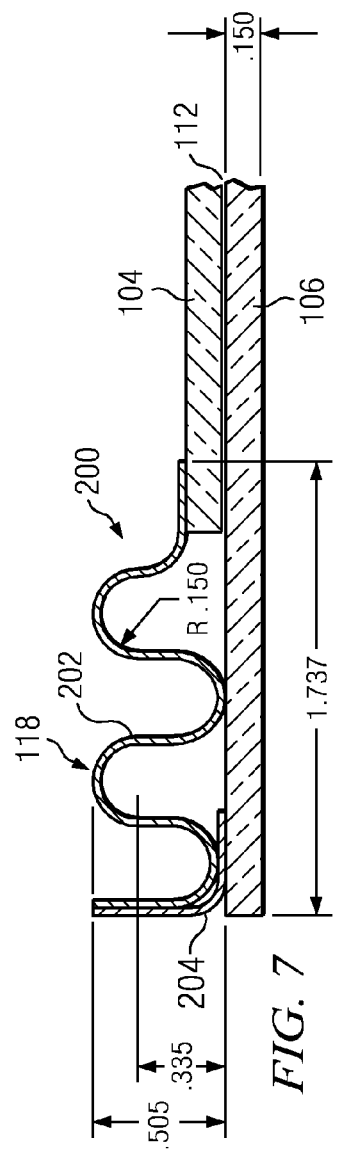

FLEXIBLE EDGE SEAL FOR VACUUM INSULATING GLAZING UNITS

CROSS-REFERENCE TO RELATED APPLICATIONS

This application claims the benefit of U.S. Provisional Application for Patent Ser. No. 61/145,095, filed on Jan. 15, 2009, and entitled FLEXIBLE EDGE SEAL FOR VACUUM INSULATING GLAZING UNIT, the specification of which is incorporated herein by reference in its entirety.

This Invention was made with government support under Contract No. DE-FC26-06NT42765 awarded by the Department of Energy. The Government has certain rights in this invention.

TECHNICAL FIELD

The following disclosure relates to insulating windows and glazing products. More particularly, it relates to vacuum insulating glazing units with multiple transparent panes having an evacuated space therebetween.

BACKGROUND

Using vacuum to increase the insulating performance of window glazing components is not a new concept, and in fact many innovative approaches have been taught in the literature over the last 75 years. It is, however, readily observed by skilled practitioners of the art that the majority of the prior work relates to low- to medium-vacuum levels, i.e., vacuum levels within the range from about 760 torr to about $10^{-3}$ torr. Note, for purposes of this application, a "higher" level of vacuum is understood to correspond to a lower absolute pressure, e.g., a vacuum level of $10^{-4}$ torr is a higher vacuum than $10^{-3}$ torr. In a few cases the literature makes reference to the measured vacuum levels in glazing components, but in many cases the maintainable vacuum level must be interpreted from careful evaluation of the materials exposed to the vacuum enclosure, the methods used to create the vacuum seal and the methods used to produce the vacuum condition in the enclosed space.

While the literature describing vacuum insulating window glazing components may not rigorously define the vacuum levels, literature from other industries, such as the electronics industry, defines different vacuum levels and the types of materials and processing methods required to achieved and maintain those specified vacuum levels. The common distinction between medium- and high-vacuum devices is a vacuum level of $10^{-3}$ torr. In other words, the range of high-vacuum levels begins at about $10^{-3}$ torr and goes higher, i.e., in the direction toward and/or past $10^{-4}$ torr. In the case of vacuum insulating window glazing components, where it is desirable for the components to retain a prescribed minimum vacuum level for an extended operating lifetime (e.g., 25 years), a vacuum containment system capable of initially maintaining a higher level of vacuum (e.g., $10^{-5}$ torr), may be necessary. For the purposes of this application, vacuum insulating glazing units capable of maintaining vacuum levels of $10^{-3}$ torr or higher are termed high-vacuum insulating glazing units (HVIGU).

One purpose of HVIGUs is to provide lower levels (i.e., compared to units with low- or medium-vacuum levels) of conductive heat losses between temperature-controlled spaces and non-temperature-controlled spaces separated by the glazing unit. In such cases providing this desired lower level of conductive heat loss over a long period of time is desirable. Since the ambient conditions in the uncontrolled space, most commonly the external atmospheric environment, produce a variety of stresses, including thermal, pressure and mechanical vibration and since, to a lesser extent, this also happens also in the conditioned space, various embodiments of the HVIGU will be more or less capable of surviving the applied stresses while maintaining the desired minimum vacuum level. Thus, the design lifetime, i.e., the period of time that the HVIGU will maintain its level of performance, is one of the performance features of the HVIGU.

Generally speaking, HVIGUs are typically constructed using at least two spaced-apart panes of glass of some prescribed thickness. These panes are then sealed, typically along the edges, using some arrangement of sealing elements which are intended to isolate the evacuated volume from the surrounding atmospheric pressure. Since the primary objective of the HVIGU is to provide a low thermally-conductive barrier between environmental spaces, each of which may have a higher or lower temperature with respect to the other, it is obvious to skilled practitioners of the art that the two panes of glass may reach temperature levels which vary distinctly from each other. In fact, for a given space-to-space temperature differential, the pane-to-pane temperature differential will typically increase as a function of reduced thermal conductivity of the HVIGU. As a result of the temperature differential between the panes of glass, the panes may expand and contract differentially. This may introduce substantial strain at the edges of the HVIGU where the seal is attached. If the seal at the HVIGU edge is made to be rigid, pane-to-pane temperature differentials may produce significant stresses in the HVIGU, along with a number of expected deleterious effects, for example, large-scale deflections, bowing and other physical or optical changes of panes and/or shortened seal life for the HVIGU.

A need exists, therefore, for a flexible edge seal for a HVIGU or other insulated glazing unit that can accommodate the strains associated with the expanding and contracting glass panes. A need further exists, for a flexible edge seal that can withstand the mechanical forces imposed by atmospheric pressure on the seal. A need still further exists, for a flexible edge seal that can retain the prescribed vacuum levels within the evacuated space.

SUMMARY

In one aspect, the invention comprises a flexible edge seal for a vacuum insulating glazing unit having a first glass pane and a second glass pane spaced-apart from the first. The edge seal comprises a seal member formed of a hermetically bondable material and having a first end, a second end and a center section disposed therebetween. The first end is hermetically bondable to a first glass pane. The second end is hermetically bondable to a second glass pane. The center section comprises a plurality of convolutes.

BRIEF DESCRIPTION OF THE DRAWINGS

For a more complete understanding, reference is now made to the following description taken in conjunction with the accompanying Drawings in which:

FIG. 2A illustrates a partial view of joining a flexible edge seal having a two-piece seal member in accordance with another embodiment;

FIG. 3 illustrates a VIGU assembly including a flexible edge seal and an end cap in accordance with another embodiment;

FIG. 6 illustrates a flexible edge seal including a stand-off assembly in accordance with another embodiment;

FIG. 7 illustrates a flexible edge seal similar to that in FIG. 2 showing typical dimensions.

DETAILED DESCRIPTION

Figure 1:
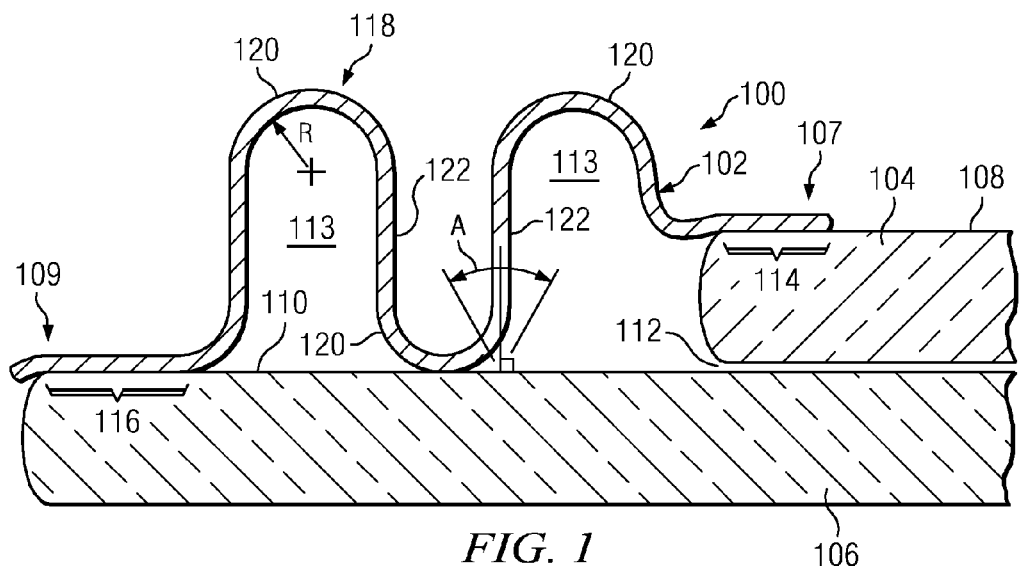
FIG. 1 illustrates a flexible edge seal having a one-piece seal member in accordance with one embodiment.

Referring now to the drawings, wherein like reference numbers are used herein to designate like elements throughout, the various views and embodiments of flexible edge seals for vacuum insulating glazing units are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The invention describes a flexible edge seal which at the same time provides the required stress mitigation, atmospheric pressure resistance and vacuum containment functions, while allowing for high-volume manufacturing methods.

Referring now to FIG. 1, there is illustrated a single-sided flexible edge seal in accordance with one embodiment. The flexible edge seal 100 is formed as a single seal member 102 from thin metal material and is bonded to a first glass pane 104 and a second glass pane 106, both bonds being from the same side. For example, in the example shown, the seal member 102 is bonded at one end 107 to the outer surface 108 of first pane 104, and at the other end 109 to the inner surface 110 of the second pane 106. The panes 104 and 106 are spaced-apart, defining a gap 112 therebetween. The gap 112 represents the space that will be evacuated to provide a thermal barrier between the panes 104, 106. It will be appreciated that the space 113 between the seal member 102 and the glass panes 104, 106 will also be evacuated. Bonding the metal seal member 102 to the glass panes 104, 106 may provide the final vacuum seal, in lieu of a separate evacuation septum, if the two bonds (or at least the final bond) are performed in a vacuum environment of the desired level of vacuum. The glass-to-metal bond areas between the metal seal member 102 and the panes 104, 106 are denoted with reference numbers 114, 116, respectively. The metal materials of the seal member 102 may include, but are not limited to, the following: titanium, stainless steel, controlled-expansion metal alloys, aluminum, copper, carbon steel, inconel and/or, nickel. The term controlled-expansion metal alloys refers to high-nickel alloys, nickel-iron alloys and other metal alloys having thermal expansion characteristics similar to any of the Permalloy brand(s) of alloy(s) available from ATI of Pittsburgh, Pa., or to any of Invar 36 brand, Low Expansion 39 brand, Low Expansion 42 brand, Thermostat 42 Alloy brand, Low Expansion 45 brand, Low Expansion 49 brand, Glass Sealing 52 brand, Alloy 42 brand, Alloy 49 brand or Kovar brand alloys available from Carpenter Technology Corporation (CARTECH) of Reading, Pa. In one embodiment, the thickness of the metal material is within the range from about 0.004 inches to about 0.040 inches. In a preferred embodiment, the metal material is a controlled-expansion metal alloy having a thickness within the range from about 0.015 inches to about 0.020 inches.

In one preferred embodiment, the single-sided flexible edge seal 100 is appropriately die-formed from a flat "picture frame," produced by welding metal strips of appropriate lengths together. In an alternate embodiment, the flat "picture frame" is formed by cutting from a single sheet of material. Another embodiment involves shaping lineal and corner section pieces separately and then welding the corner pieces to the lineal pieces in a subsequent operation, to form the final single-sided flexible edge seal configuration.

Referring still to FIG. 1, the seal member 102 may be formed into the shape of convolutes 118 which allow elastic deformation as the heated or cooled panes of glass 104, 106 expand and contract. In preferred embodiments, the convolute 118 is represented by 180 degrees of a theoretical sine wave, and may vary in overall height (i.e., top peak to bottom peak height) from about 0.20 inches to about 0.75 inches. The curved portions 120 of the convolutes may be connected by straight sections 122 which may be oriented perpendicular or non-perpendicular with respect to the largest surface of the adjacent glass pane. In one embodiment, the straight sections are oriented at an angle (denoted A in FIG. 1) within a range of plus-or-minus 30 degrees from a line perpendicular to the surface of the adjacent pane 106. It is not necessary, however, that all of the straight sections 122 have the identical orientation. The radius (denoted R in FIG. 1) of the convolute bends 120 may vary from 0.050 inches to 0.400 inches. In a preferred embodiment, the overall (peak-to-peak) height of the convolutes 118 is about 0.500 inches with a 0.125 inches bend radius R. The need to accommodate larger deflections which result from the use of larger pieces of glass is satisfied by a combination of increasing the out-of-plane height of the convolutes 118 and/or adding convolutes, thus extending the overall thickness, length and width of the HVIGU containing the flexible edge seal 100.

In some embodiments, the lower peaks of the convolute portions 118 of the seal member 102 may touch the surface 110 of the adjacent glass pane 106, normal to the glass-to-metal bonding plane 116 when vacuum is applied. This facilitates resisting collapse of the flexible edge seal 100 under atmospheric pressure with material of minimum thickness, while at the same time allowing for flexing of the convolutes 118 to allow for inner and outer pane movements, caused by temperature differentials.

The portion of the single-sided flexible edge seal material that is bonded to the glass may be tapered in thickness, ranging in some embodiments from about 2 degrees to about 10 degrees to aid in achieving minimal stress in the glass-to-metal joint. The thinnest portion of the seal material on the smaller area glass pane is oriented toward the middle of the glass pane, increasing in thickness further towards the outside edge of the assembly. The thinnest portion of the seal material on the larger glass pane is oriented toward the outside of the glass pane, decreasing in thickness further towards the outside edge of the assembly.

Figure 2:
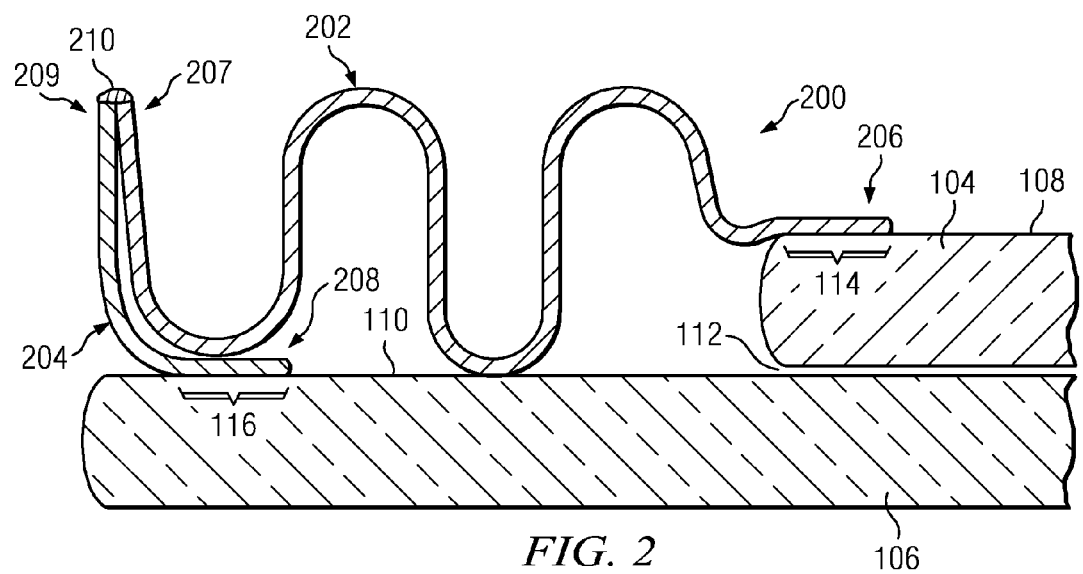
FIG. 2 illustrates a flexible edge seal having a two-piece seal member in accordance with another embodiment.

Referring now to FIG. 2, there is illustrated a single-sided flexible edge seal in accordance with another embodiment. In this embodiment the flexible edge seal 200 consists of two separately-formed pieces, namely, a first seal member 202 and a second seal member 204, which are formed of metal substantially as described above. The first seal member 202 is bonded at a first end 206 to surface 108 of pane 104, and the second seal member 204 is bonded at a first end 208 to surface 110 of pane 106. The two seal members 202, 204 are then closely fitted together at their respective other ends 207, 209 and hermetically sealed with a joint 210, e.g., a weld, to form a vacuum containing seal. The described single-sided flexible edge seal 200 arrangement includes provisions for weld joint alignment, placement of the weld and subsequent handling protection for the finished component.

Referring now to FIG. 2A, a partial view of the edge seal 200 of FIG. 2 is shown, illustrating that a compressive force may be applied to hold the two metal seal portions 207, 209 together during the welding operation to assist in achieving an optimal weld. In one embodiment, rollers 212 and 214 of an electrical resistance seam welder provide the compressive force (denoted by arrows 216 and 218) during the electrical resistance welding operation. Interference angles at the welded joint (in the area denoted 220) may be provided to facilitate the alignment of the ends 207, 209 to be subsequently welded. If resistance welding is used, the weld joint 210a may be formed in the region between the rollers 212, 214, rather than at the end of the members as was illustrated in FIG. 1.

The weld joint 210 or 210a may be oriented so that it is easily made capable of containing a high vacuum, using for example, but not limited to, one of the following methods: Laser welding; electron beam welding; seam welding (e.g., electrical resistance seam welding); solder joining; resistance welding; and/or TIG welding.

In one embodiment, the portion of the single-sided flexible edge seal that is to be welded may be located in a plane that is normal to the glass-to-metal joint. As such, it is configured in such a manner that risk of handling damage to the joint and to the single-sided flexible edge seal itself is minimized. In addition, this may facilitate "nesting" the two seal portions together.

The two panes of glass 104, 106 may be aligned and held in position prior to bonding or welding operations through the use of bent features on the single-sided flexible edge seal. This serves to simplify or eliminate complicated tooling which otherwise may be required to provide the same alignment and positioning functions.

Glass and/or metal surface pretreatments may be applied either before and/or after the forming of one or both metal seal portions, and may be applied before and/or after one or both metal seal portions is/are bonded to the associated glass pane(s). For example, to facilitate an excellent highly hermetic (i.e., vacuum-tight) weld, the metal seal material may be plated with one or more metals that improve or allow the weld process to occur. For example, nickel may be plated onto the base metal when electrical resistance seam welding is performed. The electrodes (of the seam welder) then melt the nickel and this nickel may become the welded material. In some cases, a very thin layer (sometimes referred to as a "strike") of gold (e.g., having a thickness within the range from about 50 micro-inches to about 100 micro-inches) is plated onto the nickel soon after the nickel is plated onto the base material, metal or metal alloy. The gold may serve as an oxidation/corrosion barrier on the base metal until welding occurs.

In preferred embodiments, the flexible edge seal may have one or more layers of a material applied to its surface for one of the following purposes: a) to enhance or enable welding; b) to improve resistance to environmental-borne corrosives such as acids, salt water, humidity, sulfur compounds and/or galvanic activity; and/or c) to enhance or enable forming the glass-to-metal bond between the panes and the seal material.

Appropriate vacuum seal integrity testing can be performed on the shaped flexible edge seal, prior to subsequent assembly.

Glass, because it is brittle, requires careful handling during manufacturing and assembly operations. The addition of a fragile edge seal element, potentially protruding beyond the edges of the glass panes, may further complicate the handling issues. The single-sided flexible edge seal is configured so that the fabricated VIGU can be handled and stored vertically, by resting the assembly on the protruding pane of glass. This method of handling and storage is in common use today, so the implementation and changeover costs associated with the single-sided flexible edge seal may be mitigated through this feature.

The single-sided flexible edge seal corners are rounded as shown in FIGS. 1 and 2 to minimize the stress. The inside corner radius may vary from about 0.15 inches to about 0.50 inches. The corners are to be formed from the same materials and in the same thicknesses as previously described for the straight portions of the seals.

Referring now to FIG. 3, there is illustrated a VIGU assembly 300 with flexible edge seal in accordance with another embodiment. In this embodiment, a protective "end cap" or enclosure 302 is provided surrounding the flexible edge seal 200 of the aforementioned embodiment. A profiled shape may be provided for the interior of the end cap 302, designed to be fastened in place over the edge of a VIGU assembly (including, in this example, spaced-apart panes 104, 106 and bonded seal members 202 and 204) to comprehensively protect the integrity of the single-sided flexible edge seal throughout manufacturing, shipping, installation and handling activities. The protective end cap 302 may be produced in lineal sections by an appropriate manufacturing process and is cut to fit tightly around the final VIGU assembly. The glass edges and single-sided flexible edge seal 200 are protected against damage from impacts, abrasions and other stresses associated with applied manufacturing methods.

The edge cap 302 may be configured to provide cushioned support for the edge of the glass panes 104, 106 in such a manner that the stresses imposed on the edges of the protruding piece of glass are distributed, mitigating damage to the glass. Appropriate cushioning sealant material 304 may be employed including, but not limited to: silicone, urethane, polysulfide, hot-melts and others.

The edge cap may be further provided with surface seals 306 to facilitate sealing the gap between the edge cap and the glass surface. Liquids and other debris may thereby be excluded from the enclosed volume, providing further protection against the damage of the glass and single-sided flexible edge seal. Seals 306 may be formed from materials including, but are not limited to: silicone, urethane, rubber, polysulfide, hot-melts and others. In some embodiments, the edge cap assembly 302 may include "weep" holes (i.e., drainage holes) 308 on the designated lower edge or downward-facing side of the assembly.

Figure 4:
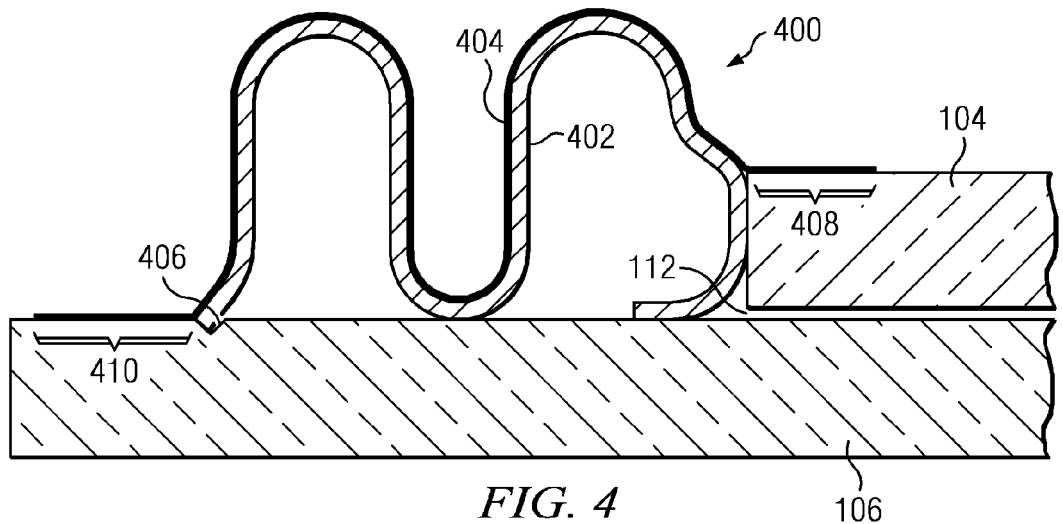
FIG. 4 illustrates a flexible edge seal having a support element and a foil element in accordance with another embodiment.
Figure 5:
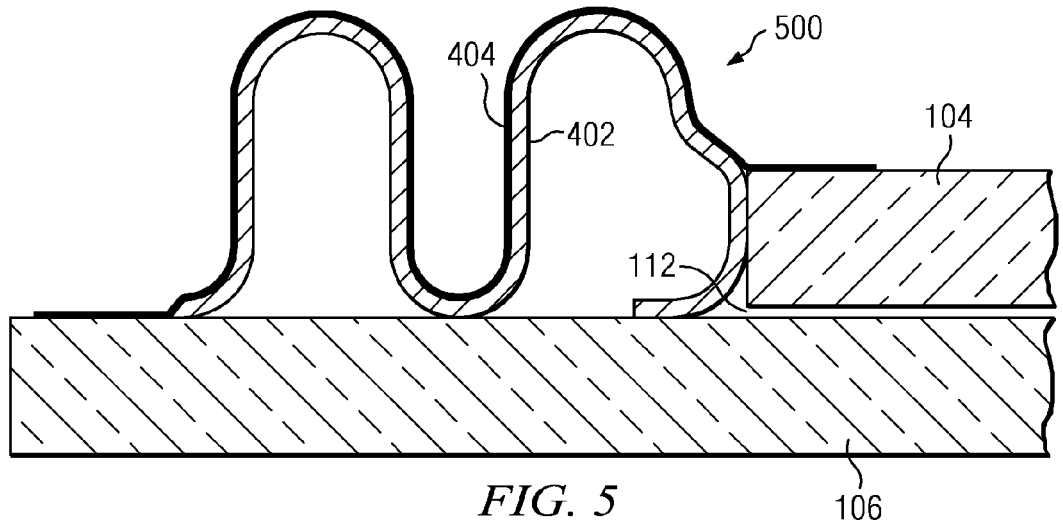
FIG. 5 illustrates a flexible edge seal having a support element and a foil element in accordance with another embodiment.

Referring now to FIGS. 4 and 5, there is illustrated additional embodiments of the flexible edge seal. In these embodiments, the flexible edge seal includes a structural supporting element that is separate from the hermetic sealing element. Both are applied together to provide a long-term durable vacuum seal for VIGU, especially those maintaining high-level vacuums.

Referring to FIG. 4, flexible edge seal 400 includes structural support element 402 and supported foil 404. The support element 402 may be formed as a single piece from thin metal material (similar to the seal members previously described), and may be positioned around the outside periphery of the smaller piece of glass as shown. Unlike the seal member is previous embodiments, however, the support element 402 need not be bonded to either of the panes 104, 106. The materials of the support element 402 may consist of, but are not limited to the following: titanium, stainless steel, controlled expansion metal alloys, aluminum, copper, carbon steel, inconel, nickel or composite. Since it need not be bonded, non-metal materials may also be used. The thickness of the metal material is in the range of 0.004 inches to 0.030 inches. The preferred embodiment is carbon steel material, 0.020 inches thick.

Referring still to FIG. 4, the support element 402 of the flexible edge seal 400 may be formed with variable prescribed numbers of convolutes of variable prescribed dimensions and prescribed material thickness. The metal material may be formed into the shape of convolutes which allow elastic deformation as the heated or cooled panes of glass expand or contract. The convolute, represented by 180 degrees of a theoretical sine wave, may vary in peak-to-peak height from about 0.20 inches to about 0.75 inches. The curved portions of the convolutes may be connected by straight sections which may be oriented perpendicular or non-perpendicular with respect to the largest surface of the adjacent glass pane. In one embodiment, the straight sections are oriented within a range of plus-or-minus 30 degrees from perpendicular with respect to the largest surface of the adjacent pane. It is not necessary, however, that all of the straight sections have the identical orientation. The radius of the convolute bends may vary from 0.050 inches to 0.400 inches. A preferred embodiment is peak-to-peak height of about 0.500 inches with about 0.125 inches bend radius. The need to accommodate larger deflections which result from the use of larger pieces of glass is satisfied by a combination of increasing the out-of-plane height of the convolutes and adding convolutes, thus extending the overall thickness, length and width of the VIGU.

Furthermore, the support element 402 is stabilized against atmospheric pressure and movement arising from glass expansion and contraction by its bearing against the smaller pane of glass 106. In the illustrated embodiment, it is further stabilized against atmospheric pressure and movement arising from glass expansion and contraction by its bearing on the vertical sides of a small groove 406 formed in the glass pane 106.

The hermetic, vacuum seal for the flexible edge seal 404 is provided through the use of a thin metal foil 404, which fits over the aforementioned structural support element 402 and is bonded to both panes of glass 104, 106 in bond areas 408, 410, respectively. In a preferred embodiment, the foil 404 may be bonded to the glass in a narrow band in the plane of the largest "X-Y" dimension in a prescribed fashion, around the periphery edge of each the inner and outer panes of glass. The width of the bonded areas 408, 410 may be in the range of about 0.1 inches to about 0.4 inches. The preferred embodiment for the bonded areas 408, 410 is about 0.150 inches wide. The foil 404 may be produced from materials including, but not limited to titanium, stainless steel, controlled expansion metal alloy, aluminum, copper, carbon steel, inconel, nickel. The preferred embodiment is stainless steel. The thickness of the vacuum seal foil 404 may be in the range of about 0.005 inches to about 0.015 inches. The preferred thickness is about 0.007 inches.

Referring to FIG. 5, there is illustrated another embodiment of a flexible edge seal including a structural support element and a supported foil. The edge seal 500 is substantially similar to that illustrated in FIG. 4, including a structural support element 402 and a supported foil 404. In this embodiment, however, a no support groove is provided in the glass pane 106.

Referring now to FIG. 6, there is illustrated another embodiment of a flexible edge seal also including a stand-off assembly. The edge seal 600 includes the seal member 602, which in this case is one-piece as shown in FIG. 1, but which in other embodiments could be multi-piece, as shown in FIG. 2. The edge seal 600 further includes an anchor member 604, a filament 606 connected to the anchor member, and a plurality of stand-off elements 608 attached on the filament. The stand-off elements 608 maintain the gap 112 (e.g., against atmospheric pressure forces) between the glass panes 104, 106 when the gap is evacuated. A second anchor member (not shown) is attached to the opposite end of the filament 606 to maintain the filament and stand-off elements 608 in place. It will be appreciated that the shape of the anchor member 604 may be selected to cooperate with the shape of the metal seal member 602 to hold the anchor member in place during assembly of the VIGU.

Referring now to FIG. 7, a seal assembly having typical dimensions is shown. The units shown are in inches.

Figure 8A:
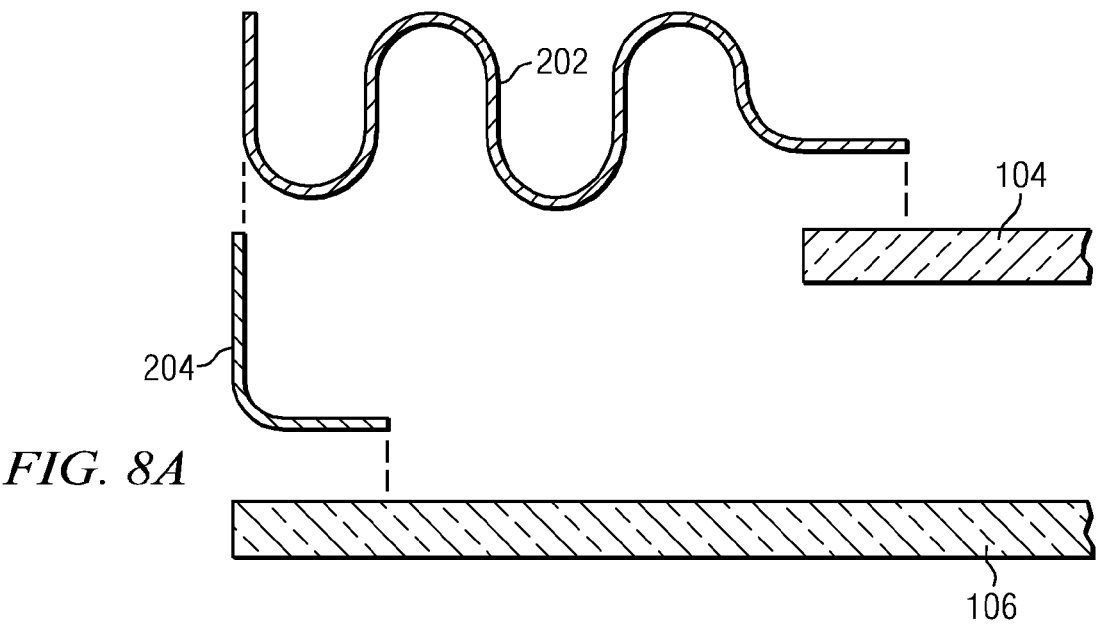
FIGS. 8A-8C illustrate a method of making a flexible edge seal similar to that in FIG. 2, FIG. 8A showing step 1, FIG. 8B showing step 2, and FIG. 8C showing step 3.
Figure 8B:
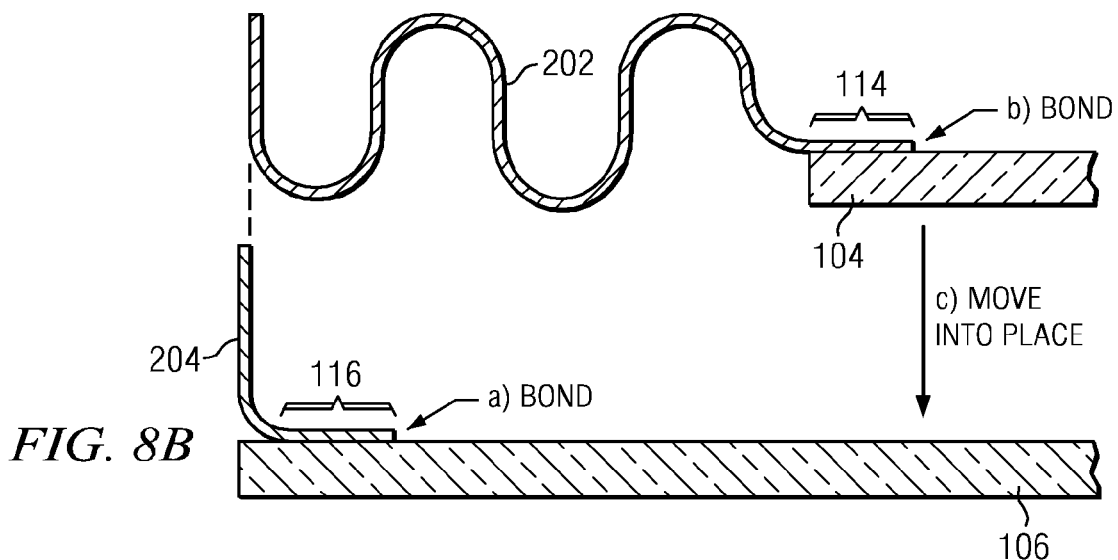
Figure 8C:
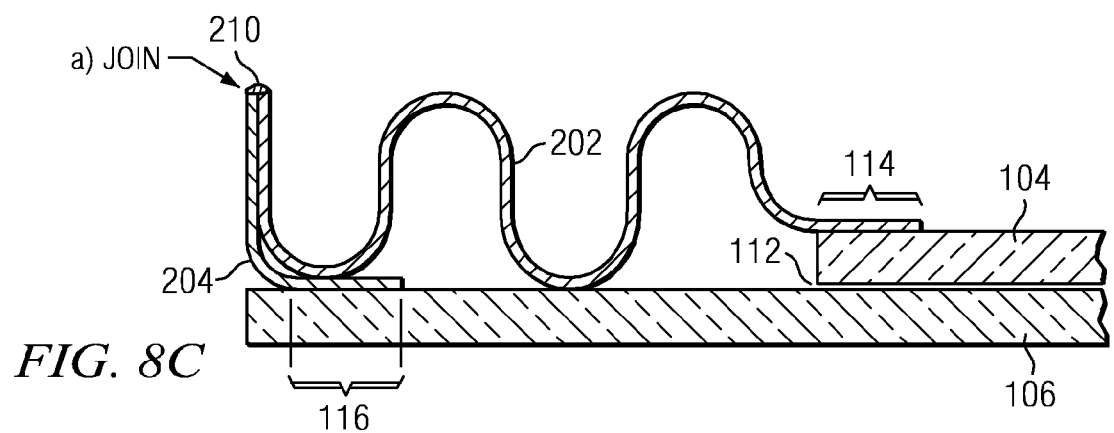

Referring to FIGS. 8A, 8B and 8C, a method of assembling a VIGU using metal seals is shown It will be appreciated by those skilled in the art having the benefit of this disclosure that these flexible edge seals for vacuum insulating glazing units provide glazing units having increased thermal barrier performance. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A flexible edge seal for a vacuum insulating glazing unit, the vacuum insulating glazing unit having a first glass pane and a second glass pane, the second glass pane being spaced-apart from the first glass pane, and each of the first and second glass panes having an inner surface facing towards the other glass pane and an outer surface facing away from the other glass pane, the edge seal comprising:

a seal member formed of a bondable material and having a first end, a second end and a center section disposed therebetween;

the first end being adapted to form a first bonding surface bondable to an outer surface of a first glass pane;

the second end being adapted to form a second bonding surface bondable to an inner surface of a second glass pane; and the center section comprising, when viewed in side cross section, a plurality of convolutes, wherein each convolute includes a convolute bend and a straight section;

wherein the seal member is formed from a thin metal material that this not self-supporting, and the flexible edge seal further comprises a support element disposed between the seal member and at least one of the glass panes, the support element also having a plurality of convolutes formed thereon, and the support element serving to support the seal member when a differential pressure is applied across the seal member; and a stand-off assembly including
an anchor member positioned between the seal member and at least one of the glass panes;
a filament connected to the anchor member; and
a plurality of stand-off elements attached to the filament;
wherein the filaments and stand-off elements may be disposed in the space between the first and second glass panes when the seal member is attached to the first and second glass panes.

2. The flexible edge seal of claim 1, wherein the straight sections of the convolutes are oriented at an angle within a range of plus-or-minus 30 degrees from a line perpendicular to the inner surface of the second glass pane.

3. The flexible edge seal of claim 1, wherein the convolute bends of the convolutes have a radius within the range from about 0.050 inches to about 0.400 inches.

4. The flexible edge seal of claim 3, wherein the convolute bends have a radius of about 0.125 inches and the overall (peak-to-peak) height of the convolutes is about 0.500 inches.

5. The flexible edge seal of claim 1, wherein at least one of the first and second end sections is tapered in thickness at an angle within the range from about 2 degrees to about 10 degrees.

6. A vacuum insulating glazing unit comprising:
a first glass pane;
a second glass pane spaced-apart from the first glass pane, each of the first and second glass panes having an inner surface facing towards the other glass pane and an outer surface facing away from the other glass pane;
an edge seal including a seal member formed of a bondable material and having a first end, a second end and a center section disposed therebetween;
the first end having a first bonding surface bonded to the outer surface of the first glass pane;
the second end having a second bonding surface bonded to the inner surface of the second glass pane; and
the center section comprising, when viewed in side cross section, a plurality of convolutes, wherein each convolute includes a convolute bend and a straight section;
wherein the seal member is formed from a thin metal material that this not self-supporting, and the flexible edge seal further comprises a support element disposed between the seal member and at least one of the glass panes, the support element also having a plurality of convolutes formed thereon, and the support element serving to support the seal member when a differential pressure is applied across the seal member; and
a stand-off assembly including
an anchor member positioned between the seal member and at least one of the glass panes;
a filament connected to the anchor member; and
a plurality of stand-off elements attached to the filament;
wherein the filaments and stand-off elements may be disposed in the space between the first and second glass panes when the seal member is attached to the first and second glass panes.

7. The vacuum insulating glazing unit of claim 6, wherein the straight sections of the convolutes are oriented at an angle within a range of plus-or-minus 30 degrees from a line perpendicular to the inner surface of the second glass pane.

8. The vacuum insulating glazing unit of claim 6, wherein the convolute bends of the convolutes have a radius within the range from about 0.050 inches to about 0.400 inches.

9. The vacuum insulating glazing unit of claim 8, wherein the convolute bends have a radius of about 0.125 inches and the overall (peak-to-peak) height of the convolutes is about 0.500 inches.

10. The vacuum insulating glazing unit of claim 6, wherein at least one of the first and second end sections is tapered in thickness at an angle within the range from about 2 degrees to about 10 degrees.

11. A vacuum insulating glazing unit comprising:
a first glass pane;
a second glass pane spaced-apart from the first glass pane, each of the first and second glass panes having an inner surface facing towards the other glass pane and an outer surface facing away from the other glass pane;
an edge seal including a seal member formed of a bondable material and having a first end, a second end and a center section disposed therebetween;
the first end having a first bonding surface bonded to the outer surface of the first glass pane;
the second end having a second bonding surface bonded to the inner surface of the second glass pane; and
the center section comprising, when viewed in side cross section, a plurality of convolutes, wherein each convolute includes a convolute bend and a straight section; and
a stand-off assembly including
an anchor member positioned between the seal member and at least one of the glass panes;
a filament connected to the anchor member; and
a plurality of stand-off elements attached to the filament;
wherein the filaments and stand-off elements may be disposed in the space between the first and second glass panes when the seal member is attached to the first and second glass panes.

12. The vacuum insulating glazing unit of claim 11, wherein the straight sections of the convolutes are oriented at an angle within a range of plus-or-minus 30 degrees from a line perpendicular to the inner surface of the second glass pane.

13. The vacuum insulating glazing unit of claim 11, wherein the convolute bends of the convolutes have a radius within the range from about 0.050 inches to about 0.400 inches.

14. The vacuum insulating glazing unit of claim 13, wherein the convolute bends have a radius of about 0.125 inches and the overall (peak-to-peak) height of the convolutes is about 0.500 inches.

15. The vacuum insulating glazing unit of claim 11, wherein at least one of the first and second end sections is tapered in thickness at an angle within the range from about 2 degrees to about 10 degrees.

16. The vacuum insulating glazing unit of claim 11, wherein the seal member is formed from a thin metal material that this not self-supporting, and the flexible edge seal further comprises a support element disposed between the seal member and at least one of the glass panes, the support element also having a plurality of convolutes formed thereon, and the support element serving to support the seal member when a differential pressure is applied across the seal member.

* * * * *